(12) United States Patent
Tjader

(10) Patent No.: US 7,217,065 B2
(45) Date of Patent: May 15, 2007

(54) MODULAR PIPE BREAKING ASSEMBLY AND METHOD

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 308 days.

(21) Appl. No.: 10/756,811

(22) Filed: Jan. 13, 2004

(65) Prior Publication Data

US 2004/0228691 A1     Nov. 18, 2004

Related U.S. Application Data

(60) Provisional application No. 60/439,925, filed on Jan. 14, 2003.

(51) Int. Cl.
    *E21B 29/00* (2006.01)
(52) U.S. Cl. ............... 405/184.3; 166/55.2; 166/55.1; 166/55.7
(58) Field of Classification Search ............. 405/184.3, 405/184, 184.1; 138/98, 99; 166/55.1, 55.2, 166/55.7, 298; 285/332.1, 332; 403/218, 403/286, 293
    See application file for complete search history.

(56) References Cited

U.S. PATENT DOCUMENTS

| 4,247,163 | A | * | 1/1981 | Lumpp et al. | ............... 385/136 |
|---|---|---|---|---|---|
| 5,127,481 | A | | 7/1992 | Hesse | ............... 405/156 |
| RE35,271 | E | | 6/1996 | Fisk et al. | ............... 405/184.3 |
| 6,109,832 | A | * | 8/2000 | Lincoln | ............... 405/184 |
| 6,357,967 | B1 | * | 3/2002 | Putnam | ............... 405/184.3 |
| 6,585,453 | B2 | * | 7/2003 | Robinson | ............... 405/184.3 |
| 2002/0067954 | A1 | * | 6/2002 | Carter et al. | ............... 405/184 |

FOREIGN PATENT DOCUMENTS

| DE | 4421923 A1 | 1/1996 |
|---|---|---|
| DE | 29921308 U1 | 3/2000 |
| EP | 0493645 A1 | 7/1992 |
| EP | 1211454 A2 | 6/2002 |
| WO | WO-9830350 | 7/1998 |

* cited by examiner

*Primary Examiner*—William Neuder
(74) *Attorney, Agent, or Firm*—Schwegman, Lundberg, Woessner & Kluth P.A.

(57) ABSTRACT

A pipe breaking assembly is shown with a modular design that allows a user to more economically purchase a single base unit that is adaptable using a number of elements. Combinations of elements such as blade portions and expander cones, etc. allow the modular assembly to be tailored to a variety of job conditions. A pipe breaking assembly is shown that includes a particular configuration where a blade portion is located in front of a shortened expander cone. The shortened expander cone provides a lower contact area that in turn reduces friction.

23 Claims, 5 Drawing Sheets

MODULAR PIPE BREAKING ASSEMBLY AND METHOD

This application claims priority to Provisional Application No. 60/439,925 filed on Jan. 14, 2003 which is incorporated herein by reference.

TECHNICAL FIELD

This invention relates to devices and methods for pipe bursting. Specifically, this invention relates to bursting heads.

BACKGROUND

Pipe such as cast iron, clay or ductile metal pipe has been used for connecting homes and creating networks for utilities such as water, sewer, or gas, etc. As pipes become old, they may crack or break, or for some other reason require replacement.

A technique know as pipe bursting is currently used as a convenient method to replace underground pipe without the need to dig up the pipe to be replaced. A pipe breaking device, such as an expander or a mole, is pulled by a cable through the existing pipe while it is still underground. The expander is designed to break, or burst the pipe, and at the same time to expand the broken pieces of the pipe into the surrounding soil. The expansion of the broken pipe allows the expander to pull a replacement pipe into place.

Bursting heads have been designed with various features such as expander cones, cutting blades, and wheel cutters to more effectively burst pipes and pull in replacement pipes. However, several pipe breaking devices including these or other features are needed to match conditions of a particular job such as, varying soil conditions, varying pipe materials, etc.

What is needed is an inexpensive and versatile expander design that provides flexibility to deal with varying job conditions. What is also needed is an improved expander design that increases the speed and decreases the power needed during a pipe bursting operation.

DETAILED DESCRIPTION

Figure 1:
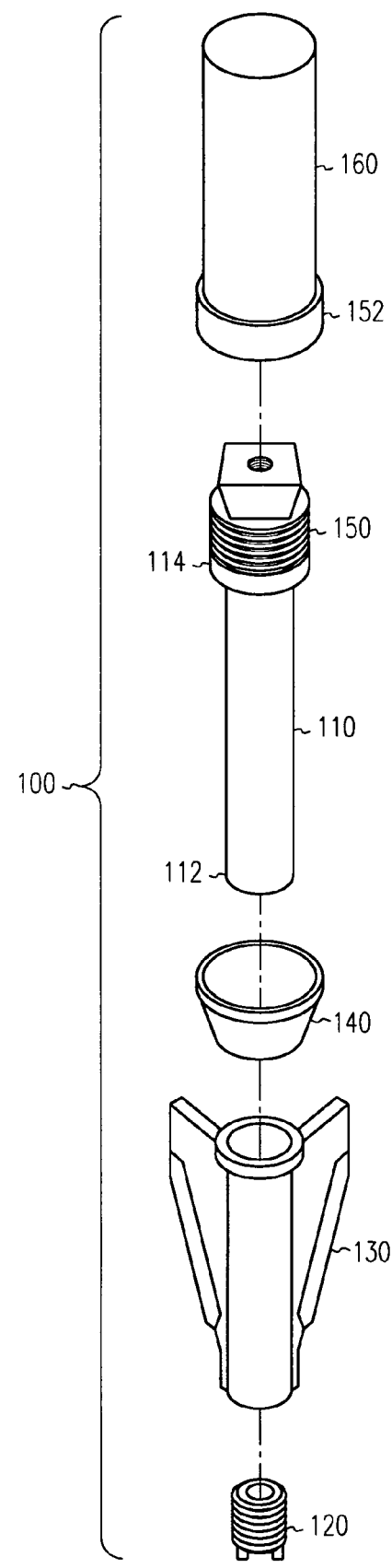
FIG. 1 shows a disassembled view of a pipe breaking assembly according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of material of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

FIG. 1 shows one embodiment of a pipe breaking assembly 100. The expander assembly 100 includes a cable holding device 120. The pipe breaking assembly 100 further includes a blade portion 130. The pipe breaking assembly 100 further includes an expander cone 140. The pipe breaking assembly 100 further includes a pipe gripping device 150. A small length of pipe 160 is shown with a retaining ring 152 located over an end of the pipe 160. A base unit 110 is shown that provides alignment and structure to the elements of the pipe breaking assembly 100.

As shown in FIG. 1, elements such as the blade portion 130 and the expander cone 140 are removable. They are designed to be slid onto the base unit 110 from the front end 112 of the base unit. During a pulling or bursting operation, a shoulder 114 or other stopping feature located at the rear end of the base unit 110 holds elements such as the expander cone 140 and the blade portion 130 in place. Once the pulling or bursting operation is complete, the elements such as the expander cone 140 and the blade portion 130 may be selectively removed over the front portion 112 of the base unit 110.

Other elements may be substituted or used in addition to the expander cone 140 and the blade portion 130 in other embodiments. For example, a pipe breaking assembly including a number of wheel cutters is included as a modular component in one embodiment. In one embodiment, multiple elements such as two or more blade portions for example, are included on a pipe breaking assembly. Although one order of modular elements is shown in FIG. 1, alternative orders are also included within the scope of the invention. For example, the blade portion 130 in one embodiment, may be located adjacent to the shoulder 114 with the expander cone 140 located near the front 112 of the base unit 110.

One advantage of a modular configuration as shown in FIG. 1 is that a single base unit can be adapted to a number of pipe breaking assembly configurations to match a variety of job conditions. A user need only purchase one base unit, and selected modular components such as the blade unit 130, the expander cone 140, or other suitable elements. Numerous combinations, orders, etc. of modular elements can be used specifically with the conditions of a particular job site, such as soil conditions and/or pipe material. Another advantage of a modular configuration is that a single base unit can be used for a variety of sizes of jobs such as varying diameters of pipe bursting and replacement.

Figure 2:
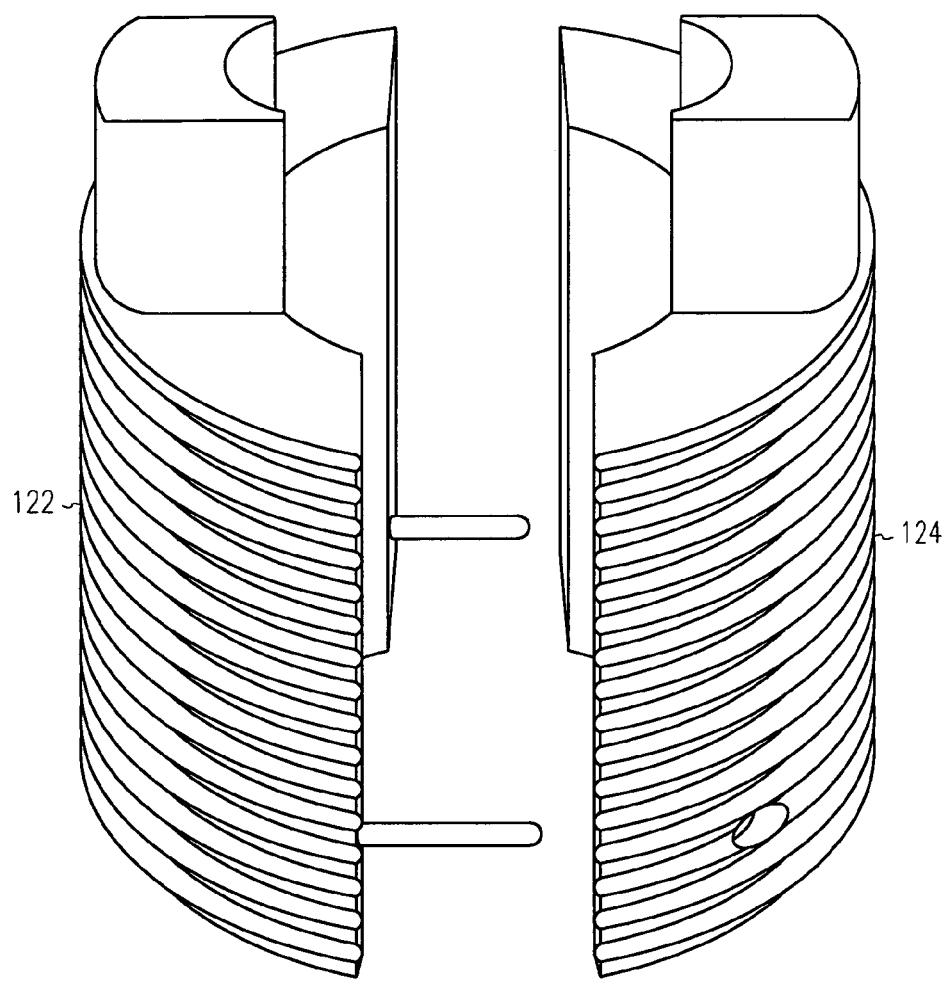
FIG. 2 shows elements of a cable holding device according to an embodiment of the invention.

FIG. 2 shows a disassembled view of the cable holding device 120. In one embodiment as shown in FIG. 2, the cable holding device 120 is divided into a first half 122 and a second half 124. One alternative embodiment includes a one piece integral cable holding device 120. The embodiment of FIG. 2 shows the first half 122 and the second half 124 guided together by a pair of pins. The embodiment of FIG. 2 also includes a number of flat portions at the top of the cable holding device 120 adapted for use with a wrench.

Cables used for pulling pipe breaking assemblies in a pipe bursting operation typically include a swage button on the pipe breaking assembly end of the cable. The swage button engages a portion of the pipe breaking assembly when it is pulled through the pipe in a bursting operation. Prior designs tended to wedge the swage button into a portion of the pipe breaking assembly, making it difficult to remove once the pulling or pipe bursting operation was complete.

In use, the first half 122 and the second half 124 of the cable holding device 120 are secured around a cable, in front of a swage button. The cable holding device 120 as a unit is then threaded into the base unit 110 from FIG. 1. In this way, the swage button is not wedged into the pipe breaking assembly, and can be easily removed by unthreading the cable holding device 120 from the base unit 110 using a tool such as a wrench after the pulling or bursting operation is complete. In an alternate embodiment, a single piece cable holding device 120 is manufactured with the cable, and included before the swage button is secured in place. This configuration eliminates the need for a split design with two halves.

Figure 3A:
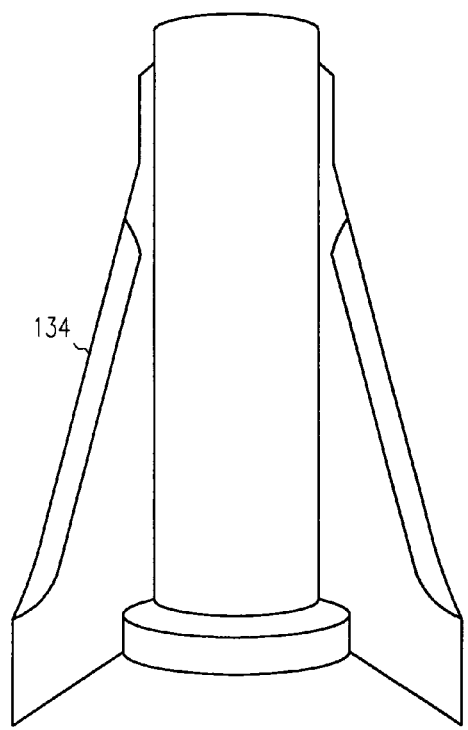
FIG. 3 shows two possible blade portions according to an embodiment of the invention.
Figure 3B:
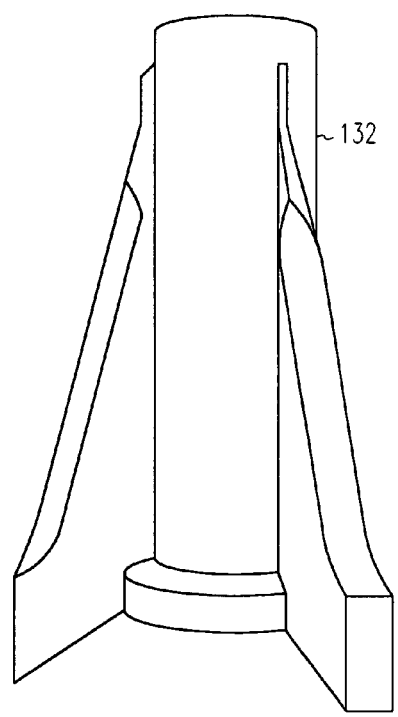

FIG. 3 shows a first configuration 132 of a blade portion and a second configuration 134 of a blade portion. The first configuration 132 includes three individual blades, and the second configuration 134 includes two individual blades spaced substantially opposite one another. Other possible configurations includes one or several individual blades. In one particular embodiment of a pipe breaking assembly, a blade portion such as shown in FIG. 3 is located in front of an expander cone as shown in FIG. 1. This configuration has advantages over pipe breaking assembly configurations with an expander cone in front. One advantage of including a blade portion in front of an expander cone is that the blade portion breaks up the pipe fragments and the soil before the cone comes into contact with them. This allows a shorter expander cone with a smaller contact area and a steeper cone gradient, because the soil offers less resistance once it is broken up. A smaller contact area is advantageous because it yields a lower friction during a pulling or bursting operation. With lower friction, a pulling or bursting operation can be performed faster or with less pulling force.

Figure 4:
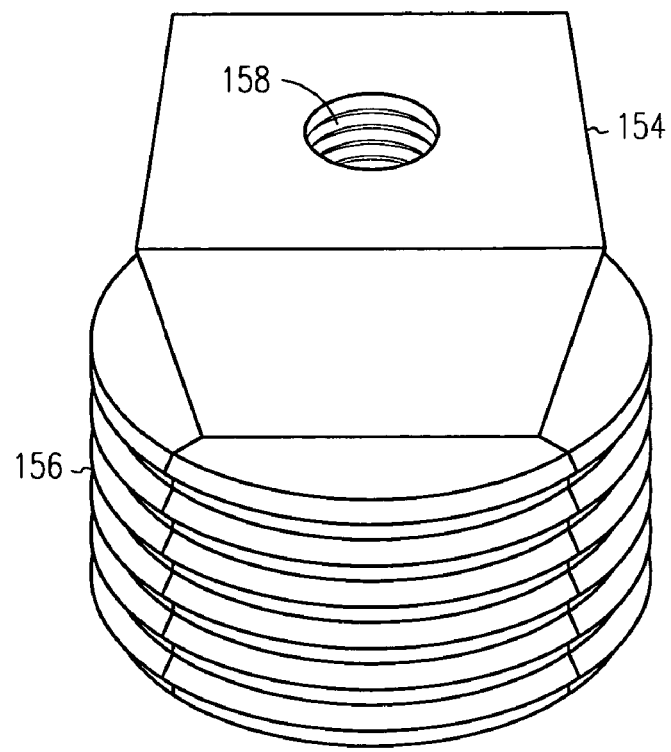
FIG. 4 shows a pipe gripping device in a non-actuated state according to an embodiment of the invention.

FIG. 4 shows an embodiment of a pipe gripping device 150. The pipe gripping device includes a wedge 154 and a number of mating portions 156. In one embodiment, the mating portions 156 each include a number of ridges as shown or other engaging features that are adapted to dig into a portion of pipe to further provide a gripping force. In the embodiment shown, four mating portions 156 are used, although other numbers of mating portions such as one, two, three or more mating portions are also within the scope of the invention. The pipe gripping device 150 further includes a threaded hole 158 that is used to pull the wedge 154 into the mating portions 156 to actuate the pipe gripping device 150 against a pipe. In one embodiment, a threaded member such as a bolt is located between the base unit 110 and the threaded hole 158 to actuate the pipe gripping device 150 and additionally to secure the pipe gripping device 150 to the base unit 110.

Figure 5:
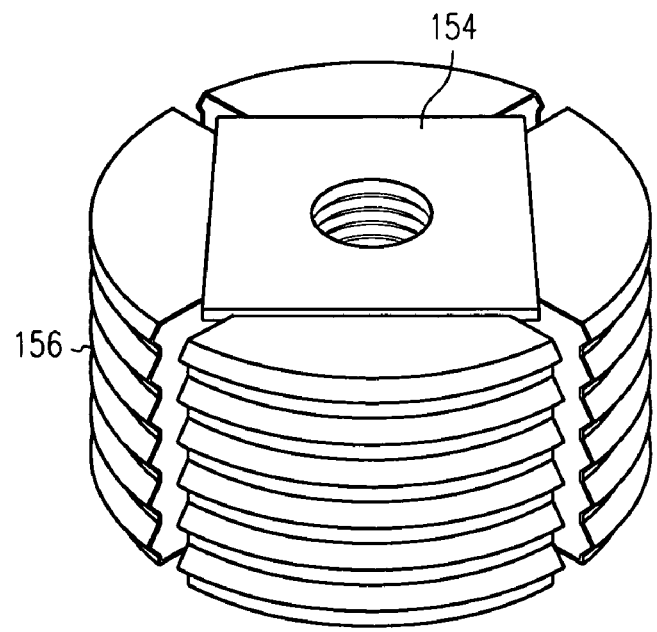
FIG. 5 shows a pipe gripping device in an actuated state according to an embodiment of the invention.

FIG. 5 shows the pipe gripping device 150 in an actuated state in contrast to the non-actuated state shown in FIG. 4. The wedge is shown pushing the mating portions 156 outward as they would be used to engage the interior of a portion of pipe, such as polyethylene pipe.

Figure 6:
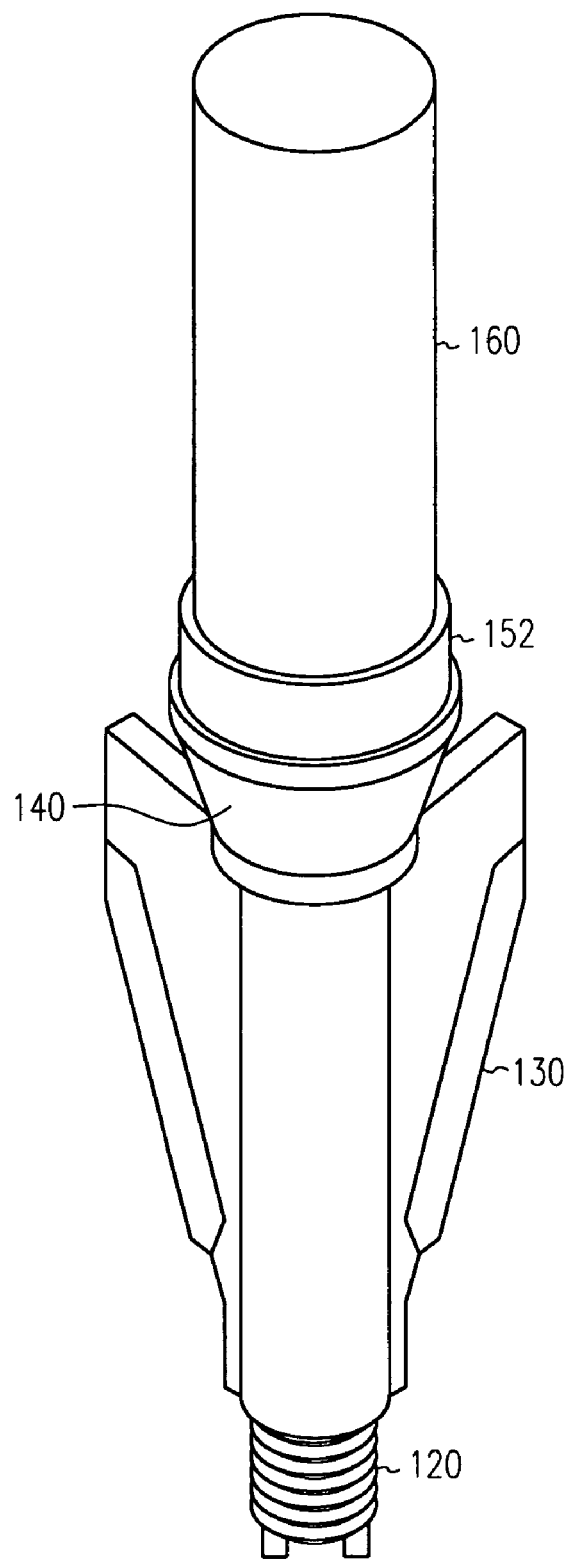
FIG. 6 shows an assembled view of a pipe breaking assembly according to an embodiment of the invention.

FIG. 6 shows an assembled pipe breaking assembly using the components shown in FIG. 1. The cable holding device 120 is shown threaded into the base unit 110. The blade portion 130 is shown in front of the expander cone 140 with the portion of pipe 160 held in place at the rear end of the pipe breaking assembly by the pipe gripping device (not shown). The retaining ring 152 is shown over a portion of the pipe 160 providing a hoop force in conjunction with the pipe gripping device.

CONCLUSION

Embodiments of pipe breaking assemblies as described above have a number of advantages. One advantage includes a modular design that allows a user to more economically purchase a single base unit that is adaptable using a number of elements. Combinations of elements such as blade portions and expander cones allow the modular assembly to be tailored to a variety of job conditions.

A further advantage of pipe breaking assemblies as described above includes a particular configuration where a blade portion is located in front of a shortened expander cone. The shortened expander cone provides a lower contact area that in turn reduces friction.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A pipe breaking device, comprising:
   a base unit;
   a retention feature located on the base unit;
   a cable attachment portion located at a first end of the base unit; and
   a number of pipe engaging elements wherein the pipe engaging elements are retained on the base unit by the retention feature, and wherein the number of pipe engaging elements are removable from the base unit and interchangeable in multiple positions along a length of the base unit, including a first configuration in which a first pipe engaging element is positioned between the retention feature and a second pipe engaging element and a second configuration in which the second pipe engaging element is positioned between the retention feature and the first pipe engaging element.

2. The pipe breaking device of claim 1, wherein the base unit includes a round shaft with a first diameter, and the retention feature includes a shoulder portion having a diameter larger than the first diameter.

3. The pipe breaking device of claim 2, wherein the shoulder portion is located at a second end of the base unit, opposite the cable attachment location.

4. The pipe breaking device of claim 1, wherein the retention feature includes a threaded fastener that connects at least one of the number of pipe engaging elements to the base unit.

5. The pipe breaking device of claim 1, further including a pipe gripping device located at a second end of the base unit, opposite the cable attachment location.

6. The pipe breaking device of claim 5, wherein the pipe gripping device includes a wedge and at least one wedge mating portion.

7. The pipe breaking device of claim 1, wherein at least one of the number of pipe engaging elements includes an expander cone.

8. The pipe breaking device of claim 7, wherein at least one of the number of pipe engaging elements includes a cutting blade.

9. The pipe breaking device of claim 1, wherein the cable attachment portion includes a threaded portion adapted to mate with a corresponding threaded portion on the first end of the base unit.

10. The pipe breaking device of claim 9, wherein the cable attachment portion includes multiple segments adapted for assembly around a cable.

11. A pipe breaking device, comprising:
a base unit;
a protruding retention feature located on the base unit;
a threaded cable attachment portion adapted to mate with a corresponding threaded portion on a first end of the base unit;
a number of pipe engaging elements wherein the pipe engaging elements are retained on the base unit by the retention feature, and wherein the number of pipe engaging elements are removable from the base unit and interchangeable in multiple positions along a length of the base unit, including at least first and second configurations, the first configuration having a first pipe engaging element positioned between the retention feature and a second pipe engaging element and the second configuration having the second pipe engaging element positioned between the retention feature and the first pipe engaging element; and
a pipe gripping device located at a second end of the base unit, opposite the cable attachment location.

12. The pipe breaking device of claim 11, wherein at least one of the number of pipe engaging elements includes an expander cone.

13. The pipe breaking device of claim 11, wherein at least one of the number of pipe engaging elements includes a cutting blade.

14. The pipe breaking device of claim 12, wherein at least one of the number of pipe engaging elements includes a cutting blade.

15. A pipe breaking device, comprising:
a base unit;
a retention feature located on the base unit;
a cable attachment portion located at a first end of the base unit; and
a number of pipe engaging elements wherein the pipe engaging elements are retained on the base unit by the retention feature with a first pipe engaging element abutting the retention feature and a second pipe engaging element abutting the first pipe engaging element, and wherein the number of pipe engaging elements are removable from the base unit and interchangeable in multiple positions along a length of the base unit.

16. The pipe breaking device of claim 15, wherein retention feature includes a shoulder portion having a larger cross section dimension than a cross section dimension of the base unit.

17. A pipe breaking device, comprising:
a base unit;
at least one pipe engaging element located along a length of the base unit;
a pipe gripping device having a wedge and at least one wedge mating portion; and
a cable holding device to selectively attach to a first end of the base unit; including:
a plurality of segments that are laterally removable from a portion of a cable; and
a threaded portion on a surface of the plurality of segments to thread into the first end of the base unit when assembled around the portion of the cable.

18. The pipe breaking device of claim 17, further including a cable with a swage portion on an end of the cable, wherein the plurality of segments of the cable holding device abut against the swage portion during a pipe breaking operation.

19. A pipe breaking device, comprising:
a base unit;
a retention feature located on the base unit;
a cable attachment portion located at a first end of the base unit;
a pipe gripping device having a wedge and at least one wedge mating portion; and
a number of pipe engaging elements wherein the pipe engaging elements are retained on the base unit by the retention feature, and wherein the number of pipe engaging elements are removable from the base unit.

20. The pipe breaking device of claim 19, wherein the wedge has four sides.

21. The pipe breaking device of claim 20, wherein the pipe gripping device includes four wedge mating portions.

22. The pipe breaking device of claim 19, wherein the at least one wedge mating portion includes a number of pipe engaging ridges.

23. The pipe breaking device of claim 22, wherein the pipe engaging ridges are disposed around an outer surface of the at least one wedge mating portion.

* * * * *